(12) United States Patent
Preisler et al.

(10) Patent No.: US 6,280,823 B1
(45) Date of Patent: *Aug. 28, 2001

(54) FOIL-COVERED PLASTIC PART AND METHOD OF MAKING SAME

(75) Inventors: Darius J. Preisler, Macomb; Jason T. Murar, Clinton Township, both of MI (US)

(73) Assignee: Patent Holding Company, Fraser, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/144,315

(22) Filed: Aug. 31, 1998

Related U.S. Application Data

(63) Continuation-in-part of application No. 09/083,943, filed on May 22, 1968.

(51) Int. Cl.$^7$ ................. B32B 3/00; B60R 21/20
(52) U.S. Cl. ................ 428/172; 428/31; 428/35.9; 428/187; 428/207; 428/209; 280/728.3; 280/732
(58) Field of Search ................. 280/728.3, 731, 280/732; 428/156, 458, 31, 172, 207, 187, 209, 77, 78, 79, 35.7, 452.2, 421, 483, 412, 480, 423.7, 35.9, 192

(56) References Cited

U.S. PATENT DOCUMENTS

| | | | |
|---|---|---|---|
| 4,292,827 | * 10/1981 | Waugh | 72/46 |
| 4,769,100 | 9/1988 | Short et al. | 156/285 |
| 4,877,657 | * 10/1989 | Yaver | 428/31 |
| 4,902,557 | 2/1990 | Rohrbacher | 428/215 |
| 4,952,351 | 8/1990 | Parker et al. | 264/46.4 |
| 5,342,666 | * 8/1994 | Ellison et al. | 428/46 |
| 5,466,412 | 11/1995 | Parker et al. | 264/255 |
| 5,529,336 | * 6/1996 | Eckhout | 280/728.3 |
| 5,678,851 | 10/1997 | Saito et al. | 280/728.3 |
| 5,731,064 | * 3/1998 | Suss | 428/195 |
| 5,769,548 | 6/1998 | Thompson et al. | 400/208 |

FOREIGN PATENT DOCUMENTS

| | | |
|---|---|---|
| 06091758 | * 9/1992 | (JP) . |
| 07205536 | * 1/1994 | (JP) . |

* cited by examiner

Primary Examiner—Donald J. Loney
(74) Attorney, Agent, or Firm—Brooks & Kushman P

(57) ABSTRACT

A foil-covered plastic part is provided including a hot stamping foil having a foil top layer disposed on a plastic bottom layer which, in turn, is bonded to a plastic outer surface of a decorative preform at foil-receiving portions of the plastic outer surface. A hot stamping machine is operated for a time sufficient to generate a pressure and temperature sufficient to melt and combine the top surface of the at least one foil-receiving portion and the plastic bottom layer of the hot stamping foil to form the foil-covered plastic part. The at least one foil-receiving portion includes a plurality of raised design portions having top and side surfaces. The foil layer completely covers the top surfaces but not the side surfaces of the raised design portions. Preferably, the raised design portions represent graphical information. The decorative preform is bonded to an outer surface of a plastic structural substrate which may be a plastic front panel of an automotive air bag cover adapted to enclose an uninflated automotive air bag.

6 Claims, 4 Drawing Sheets

FOIL-COVERED PLASTIC PART AND METHOD OF MAKING SAME

CROSS-REFERENCE TO RELATED APPLICATION

This application is a continuation-in-part application of U.S. patent application Ser. No. 09/083,943, filed May 22, 1998 pending, entitled "Method Of Manufacturing In-Mold Laminate Component".

TECHNICAL FIELD

This invention relates to foil-covered plastic parts and method of making such parts and, in particular, to foil-covered plastic parts and methods of making such plastic parts utilizing a hot stamping machine.

BACKGROUND ART

Typically, plastic parts are painted after they are molded. The painting process requires elaborate facilities and consequently necessitates large expenses. For instance, significant square footage of a factory must be dedicated to a clean room environment for the spraying of paint and clear coat and for the baking and curing of paint on components, such as those components used in the automotive industry, such as body panels, air bag covers, instrument panels and the like. Moreover, solvent-based paints have in recent years raised significant environmental concerns because of the volatile organic components which are emitted into the air during the application of such solvent-based paints. As a result, the evaporation of such solvents must be strictly monitored to satisfy environmental and safety regulations.

In addition, automotive components, especially interior automotive components, are strictly scrutinized following the painting process in order to match or conform the automotive component to the styling and aesthetic requirements of the associated interior trim product. Painting such automotive components following the molding process, raises quality concerns with respect to the color, consistency, and thickness of each individual paint application.

U.S. Pat. No. 4,902,557, the Rohrbacher reference discloses a method and apparatus for manufacturing a thermoplastic polyolefin composite useful as an exterior auto or truck body part.

U.S. Pat. No. 4,769,100, the Short reference, teaches a method of applying a carrier film pre-printed with metallic paint to an automobile body panel in a vacuum forming process.

U.S. Pat. Nos. 4,952,351 and U.S. Pat. No. 5,466,412, the Parker patents, teach a method of manufacturing an air bag cover for an inflatable air bag system including a bondable film carrier, which is painted after the film carrier is molded.

Hot stamping is utilized for plastic decorating. For example, U.S. Pat. No. 5,769,548 discloses a hot stamp imprinting system with latchable ink ribbon cassette and handle.

However, the prior art fails to provide a foil-covered plastic part and method of making same wherein hot stamping is used and wherein the foil is bonded to the plastic part so as to have the durability and strength necessary to support varying applications.

DISCLOSURE Of INVENTION

An object of the present invention is to provide a foil-covered plastic part and method of malding same wherein decorative features formed on an outer surface of the plastic part such as raised letters, scripts, logos, etc. are foiled to present an aesthetically pleasing appearance.

In carrying out the above object and other objects of the present invention, a foil-covered plastic part is provided. The foil-covered plastic part includes a plastic structural substrate having an outer surface and a decorative preform bonded to the outer surface. The preform has at least one foil-receiving portion formed in a plastic outer surface thereof. The foil-covered plastic part also includes a hot stamping foil having a foil top, layer disposed on a plastic bottom layer which, in turn, is bonded to the plastic outer surface of the at least one foil-receiving portion to form the foil-covered plastic part.

The at least one foil-receiving portion may include a plurality of raised design portions having top and side surfaces and wherein the foil layer completely covers the top surfaces but not the side surfaces of the raised design portions.

The raised design portions may represent graphical information.

The decorative preform preferably comprises a plastic film sheet compatible with the plastic of the substrate so that fusion occurs between the plastic film sheet and the outer surface of the substrate. The plastic film sheet is shaped correspondingly to the outer surface of the substrate.

The plastic film sheet is preferably covered with a layer of acrylic color and polyvinylidine fluoride and an acrylic clear coat layer and wherein the plastic layer of the hot stamping foil is compatible with the acrylic clear coat layer so that diffusion occurs therebetween.

In one embodiment, the foil layer is a chrome layer.

In the embodiment shown, the substrate is a plastic front panel of an automotive air bag cover adapted to enclose an uninflated automotive air bag.

Still further in carrying out the above object and other objects of the present invention, a method is provided for making the foil-covered plastic part. The method includes providing a film sheet, vacuum molding the film sheet in a mold cavity to obtain a decorative preform having plastic top and bottom surfaces, and placing the decorative preform in a mold cavity of an injection mold having a shape defining the part. The method also includes injecting a thermoplastic elastomer into the mold cavity of the injection mold to generate a substrate of the part wherein the generation of the substrate of the part creates sufficient pressure and heat to bond the substrate to the bottom surface of the decorative preform and to form at least one foil-receiving portion at the plastic top surface of the preform. The method also includes the steps of providing a hot stamping foil having a foil top layer disposed on a plastic bottom layer, aligning the hot stamping foil with the at least one foil-receiving portion in a hot stamping machine, and operating the hot stamping machine for a time sufficient to generate a temperature and a pressure sufficient to melt and combine the top surface of the at least one foil-receiving portion and the plastic bottom layer of the hot stamping foil to form the foil-covered plastic part.

Important advantages of hot stamping are:

Dry Decorating Method—There is clean-up required with hot stamping. A hot stamped part is immediately ready for handling and packaging.

Variety of Materials—A variety of materials can be decorated using the hot stamping process. The most commonly decorated material is thermoplastics, but thermosets as well as wood, book cloth, leather, textiles, paper, cardboard and pre-painted metals are stamped with great success.

Variety of Decorating Finishes—Hot stamping is a decorative method where permanent gold and silver metallic graphics can be produced. Foils are also manufactured in gloss or matte pigment colors, wood grain designs, brushed effects, and chromium for exterior use. Multi-colored graphics can also be accomplished with pre-printed heat transfers and continuous patterned foils.

Variety of Surface Geometries—Hot stamp foils can be applied to a variety of surface geometries including flat, cylindrical and spherical shaped parts along with raised beads graphics.

Minimum Set-Up Time—To change the stamping color simply involves changing a dry roll of hot stamp foil.

Permanent Decoration—Hot stamping foil has excellent adhesion and abrasion resistance due to thermal bonding that takes place.

EPA or Fire Safety Considerations—With hot stamping, there are no EPA or fire safety considerations to be concerned about. Hot stamping, unlike other decorating methods, does not require any special storage, insurance or removal of hazardous solvents or vapors.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
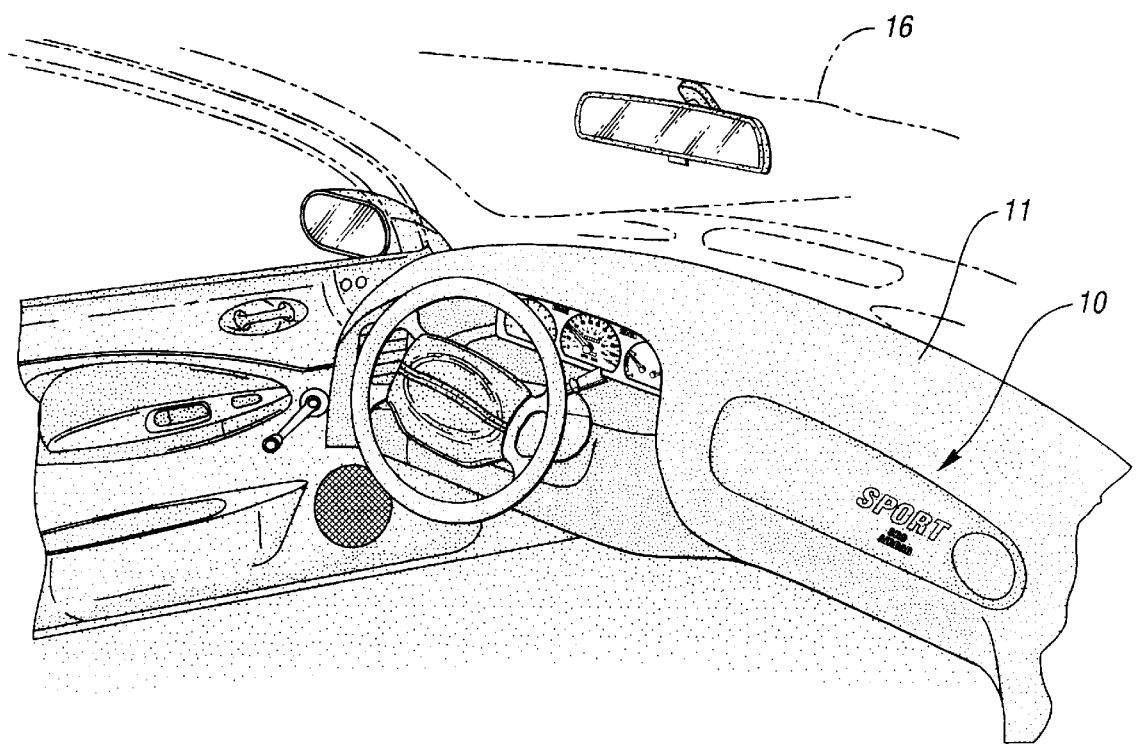
FIG. 1 is an environmental view showing a foil-covered plastic part constructed in accordance with the method of the present invention.

Referring now to the drawing Figures, there is illustrated in FIG. 1 an environmental view illustrating an embodiment of a foil-covered plastic part, generally indicated at 10, constructed in accordance with the method of the present invention. The foil-covered plastic part 10 is an automotive air bag cover adapted to enclose an uninflated automotive air bag and is typically mounted on a surface of an instrument panel 11 located in underlying relationship to a sloped front windshield 16.

Figure 2:
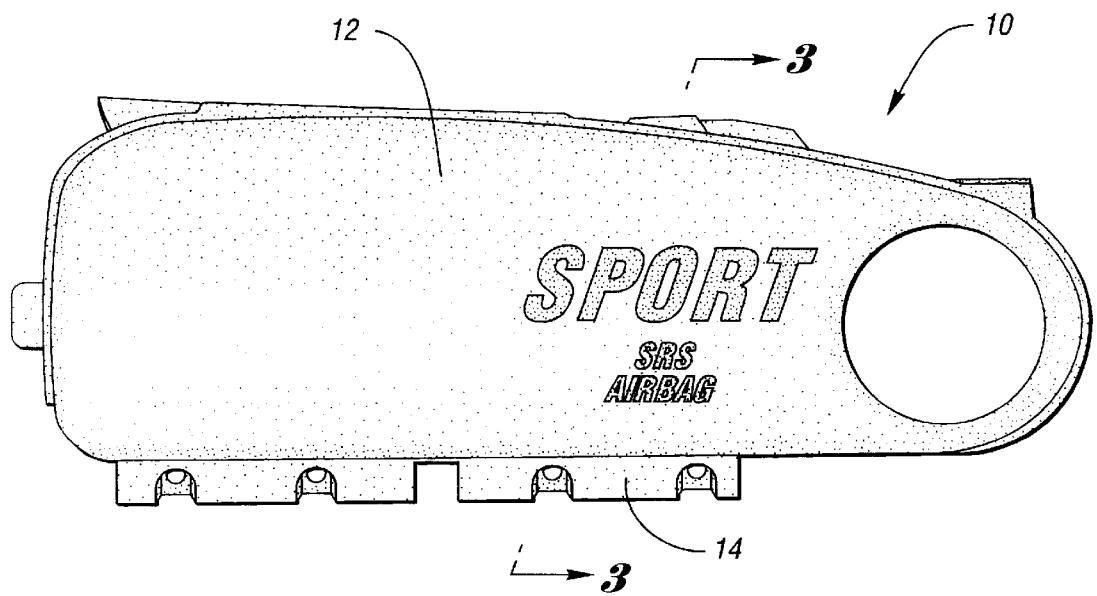
FIG. 2 is a front elevational view of one type of foil-covered plastic part to be included in an instrument panel.

Referring now to FIG. 2, there is illustrated a front elevational view of the air bag cover 10. The air bag cover 10 includes a painted one-piece preform 12, composed of a film sheet, preferably a pre-painted film sheet, which is vacuum molded in a vacuum mold from a material compatible with an air bag body or structural substrate 14, which is preferably injection molded in an injection mold. The substrate 14 is preferably composed of a thermoplastic elastomer. The elastomer of the air bag body or substrate 14 should be compatible with the preform 12 so that a bottom contact surface of the preform 12, bonds with the front contact surface of the substrate 14 by diffusion between the surfaces thereof in the injection mold to prevent the substrate 14 from separating from the preform 12 during use of the air bag cover 10.

The preform 12 is composed of a film sheet that is pre-painted. The film sheet is preferably a polyester sheet such as Mylar®, a polyurethane or polycarbonate sheet.

In the preferred embodiment, the preform 12 comprises a film sheet with the following coatings placed thereon: a layer of acrylic color in mating contact with the film sheet and a layer of polyvinylidine fluoride (PVDF) with an acrylic clear coat to protect the film from damage and to provide film elasticity, chemical resistance, stain resistance, weathering and UV protection. In the most preferred embodiment, PVDF comprises 72% of the total film thickness which is, preferably, 0.2 mils.

The thermoplastic elastomer of the air bag body or substrate 14 is preferably a thermoplastic elastomer such as a thermoplastic polyolefin, thermoplastic urethane, polyester, polycarbonate, a mixture of polycarbonate and ABS (acrylonitrile/butadiene/styrene) or similar material.

For other automotive applications, the substrate 14 is varied to accommodate the intended use. Accordingly, for bumper/fascia applications, the substrate 14 can be selected from at least the following materials: lomod®, bexloy® and thermoplastic polyolefin. For cluster bezel applications, the substrate 14 can be selected from at least the following materials: ABS (acrylonitrile/butadiene/styrene), a mixture of polycarbonate and ABS, polycarbonate, and polypropylene.

The body of the air bag cover or substrate 14 may also be formed from thermoplastic polyolefin, polycarbonate, tee tpe, sebs tpe, and a mixture of polycarbonate and acrylonitrilelbutadiene/styrene (ABS). The corresponding preform 12 must be compatible with the plastic of the substrate 14 so that diffusion between contact surfaces occurs. In general, this requirement is achieved by selecting a substrate 14 with at least one or more materials common to the preform 12.

The durometer and elastic or flex modulus of the materials also vary depending on the desired stiffness of the component. Typically, the durometer of the substrate 14 will be in the range of about 20 Shore D to 100 Shore D, while the flexural modulus will be in the range of about 15,000 to about 400,000 psi. Also, typically, the durometer of the preform 12 will be in the range of about 15 Shore A to 100 Shore A. These ranges of course vary depending on the desired plastic component to be manufactured and are only illustrative of one example.

Figure 3:
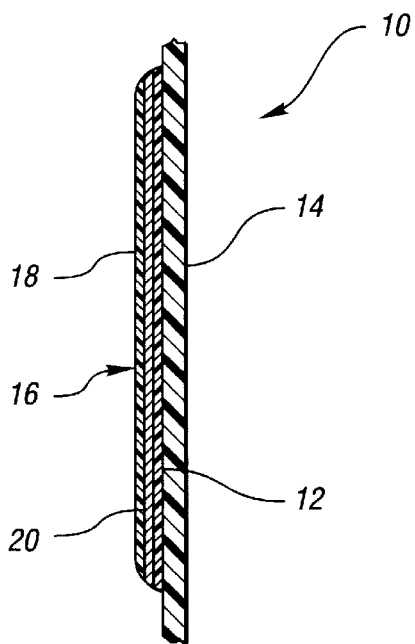
FIG. 3 is a sectional view, partially broken away, taken along lines 3—3 in FIG. 2 to illustrate the various layers of the foil-covered plastic part.

As depicted in FIG. 3, a sectional view of the air bag cover of FIG. 1 taken along lines 3—3, is shown. The air bag body or substrate 14 supports the preform 12 which has a pre-painted coating placed thereon, followed by a base coat, preferably a layer of acrylic color, and a clear coat, preferably an acrylic clear coat and a layer of PVDF as previously shown. As also shown in FIG. 3, a hot stamping foil, generally indicated at 16, includes a foil top layer 18 disposed on a plastic bottom layer 20. The plastic bottom layer 20, which may be a polyester film layer, is bonded to raised decorative indicia (i.e. the word "sport") on the plastic outer surface of the preform 12. In other words, the plastic bottom layer 20 bonds with the acrylic clear coat and the layer of PVDF at raised surface portions of the preform 12.

Figure 4:
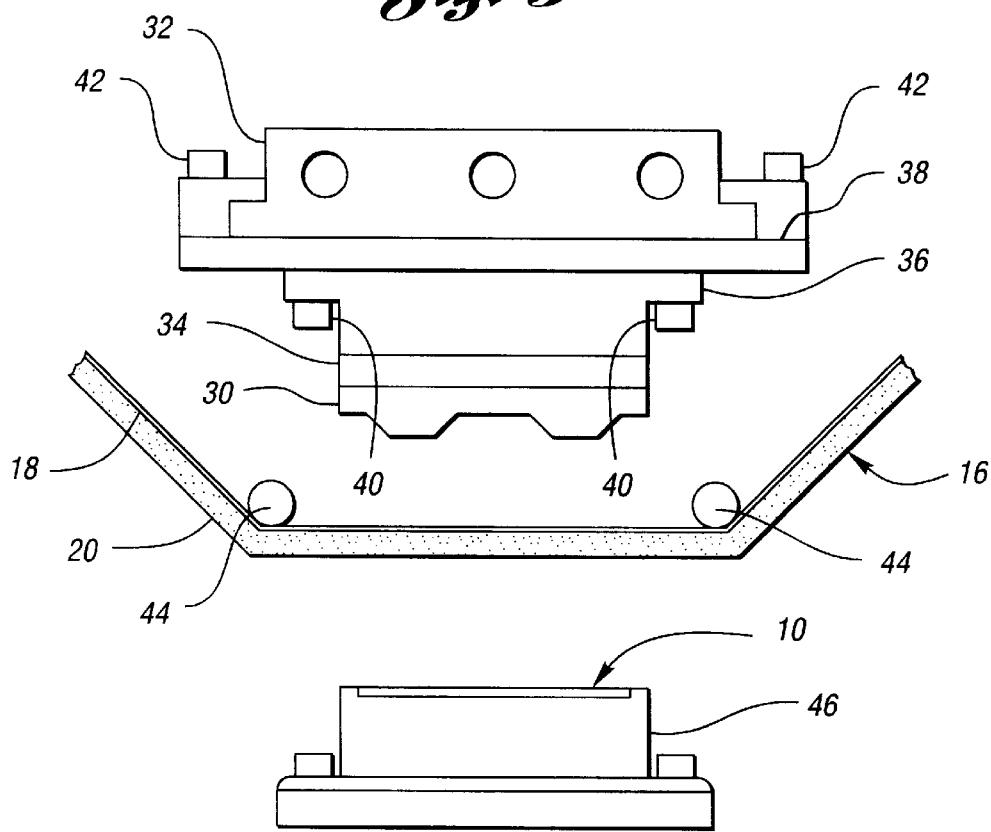
FIG. 4 is a side schematic view of a hot stamping machine in a vertical stamping set up.

Referring now to FIG. 4, there are illustrated parts of a hot stamping machine for use in foiling the plastic part 10 of the present invention.

In the thermoplastic foil, vertical stamping arrangement illustrated in FIG. 4, a silicone rubber die 30 is mounted to an aluminum backing plate 34 which, in turn, is mounted to a die mounting block 36 which, in turn, is mounted to a die mounting plate 38 by means of bolts 40 which, in turn, is mounted to a heater head by bolts 42.

The silicone die 30 consists of heat stable silicon rubber available in a wide range of hardness (durometer) bonded to the aluminum packing plate 34. The graphics illustrated in FIG. 2 which are to be stamped such as the word "sport" are lowered on the die surface a minimum of 1/32" and are heated to a temperature near the melting point of the plastic layer 20, usually in excess of 300° F. Centered directly below the silicone die 30 in a path defined by two stripper bars 44 is the hot stamp foil 16 consisting of one or more thin coatings such as the plastic bottom layer 20 deposited on a film carrier in the form of the foil top layer 18. Typically, there is approximately ½ inch space between the foil top layer 18 and the hot die face of the silicone die 30 so that the release characteristics of the hot stamping foil 16 and the hot die face of the silicone die 30 are affected as little as possible by heating convection.

Supported directly below the silicone die 30 and the hot stamping foil 16 is aligned a part holding fixture 46 which supports the air bag cover 10 so that the raised graphic design (i.e., the word "sport") formed thereon is aligned within ¼ to 1/10 of a millimeter with the graphics formed on the face of the silicone die 30.

Referring now to Figures 5a–5e, there are illustrated the various steps taken in the hot stamping machine to make the foil-covered plastic part 10.

Figure 5A:
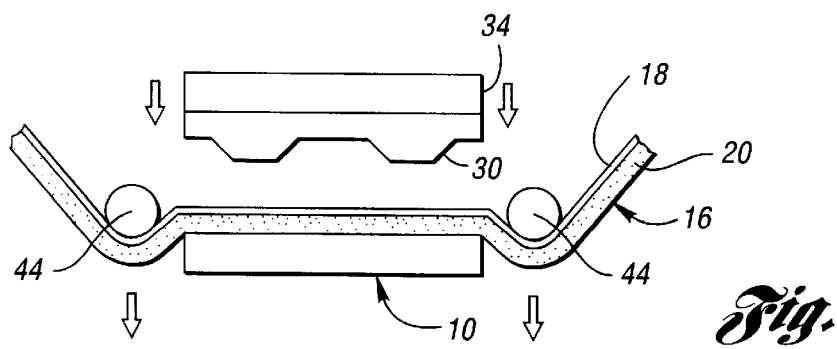
FIGS. 5a–5e are side schematic views illustrating the various steps taken by the hot stamping machine of FIG. 4 in order to cover portions of a plastic part with foil.

With particular reference to FIG. 5a, when the machine sequence has been initiated, the silicone die 30 and its aluminum backing plate 34 are sent toward the foil-receiving surface of the preform 12 to be decorated. The foil 16 travels with the die 30 and, at the same time, maintains its distance from the die face. The foil 16 contacts the part 10 first and the stripper bars 44 act to push the foil 16 tightly over the surfaces of the raised design portions (i.e. the word "sport") to remove any wrinkles.

Figure 5B:
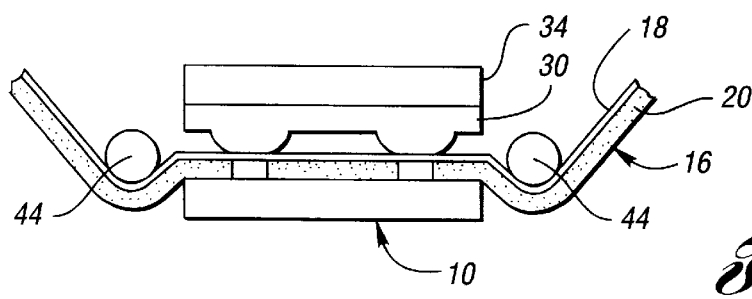

Referring now specifically to FIG. 5b, a fraction of a second after the foil 16 is pushed over the part 10, the hot stamp die surface of the die 30 makes contact simultaneously with the foil 16 and the rigidly supported plastic part 10. The pressure that is exerted accomplishes two things. First, the silicone rubber of the die 30 compresses and conforms to any small surface variation in the part decorating area (i.e., the decorative surface portion or word "sport") so that even contact is achieved. Second, the foil resins together with the corresponding portions of the foil top layer 18 in the graphic area will break cleanly creating a parting line.

Figure 5C:
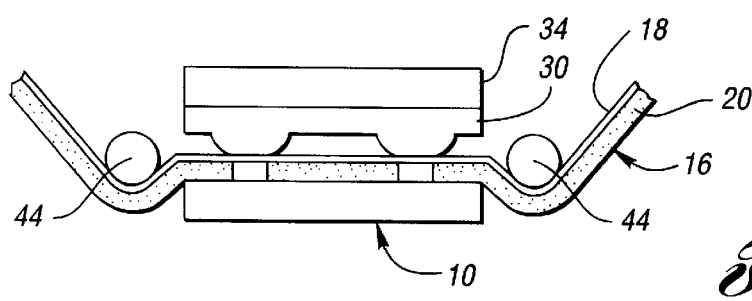

Referring now specifically to FIG. 5c, during the dwell time illustrated in FIG. 5c, the period that the hot die 30 is in contact with the foil 16 and the part 10, heat conduction causes the release agents and resins of the foil 16 to soften. At the same time, the acrylic clear coat and layer of PVDF begins to soften and the pressure exerted by the hot stamping machine helps the resins of the plastic bottom layer 20 penetrate the molten plastic of the preform top layer to promote thermal bonding.

Figure 5D:
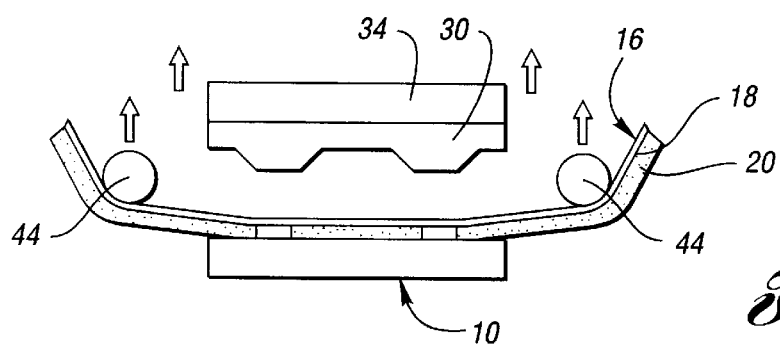

Referring specifically now to FIG. 5d, at the end of the dwell time, the head of the machine, including the silicone die 30 and aluminum backing plate 34, retracts and begins its ascent to its start position. First, the die 30 moves away from the part 10 while the foil 16 remains on the surface for a split second, allowing the foil 16 to cool and plasticize. Then as the die 30 continues to rise, portions of the foil 16 over the raised graphics are peeled away from the rest of the foil 16. At this point, adhesion between the part 10 and the portions of the foil coatings is greater than the bond between the release agents in the coatings and the rest of the foil 16 resulting in virtual complete deposition of the foil coatings over the word "sport."

Figure 5E:
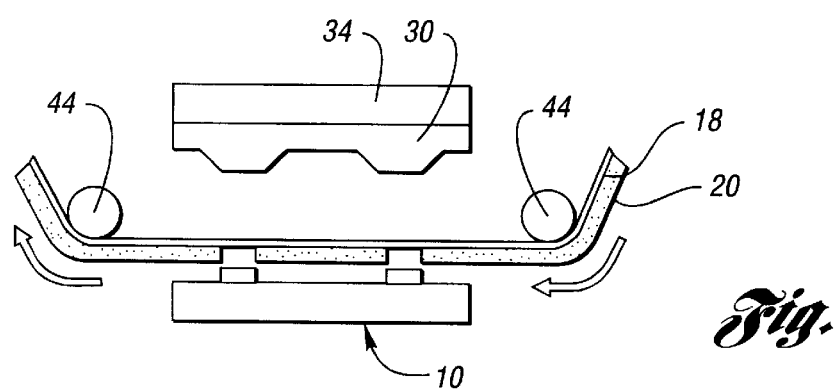

Referring now to FIG. 5e, as soon as the head of the machine, including the die 30, returns to its original position, the foil 16 will advance and n unused section will be positioned under the die 30. Finally, the hot stamped art 10 can be removed from the fixture 46 and handled or packaged as necessary without any danger of rubbing the foil off the decorative portions of the preform 12.

Figure 6:
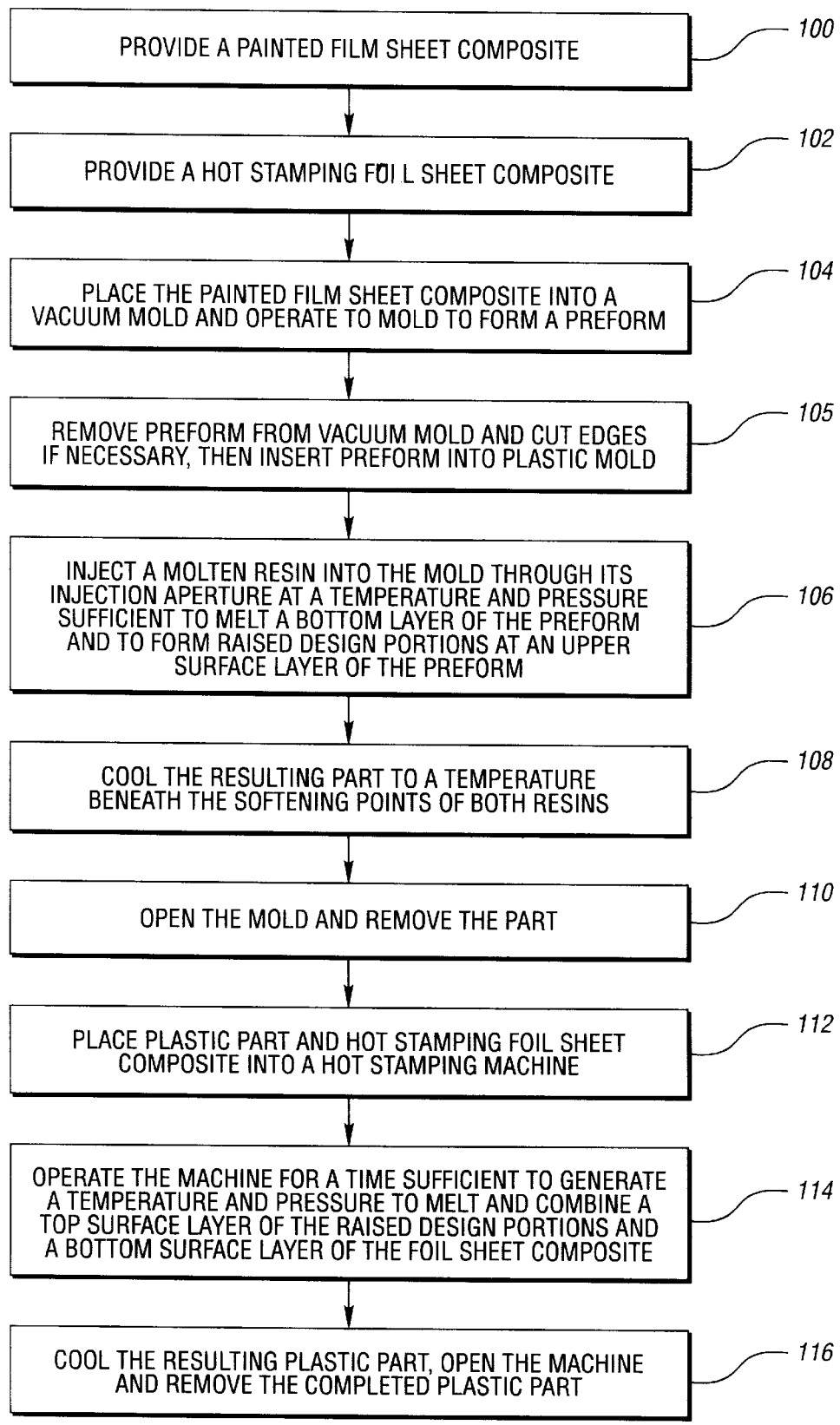
FIG. 6 is a block diagram flow chart illustrating the various method steps in forming the foil-covered plastic part constructed in accordance with the present invention.

Referring now to FIG. 6, there is illustrated in block diagram flow chart form the various method steps for making the foil-covered plastic part 10 of the present invention.

At block 100, a painted film sheet composite is provided as described above.

At block 102, a hot stamping foil sheet composite 16 is also provided.

At block 104, the painted film sheet composite is placed into a vacuum mold and the vacuum mold is operated to form the preform 12.

At block 105, the preform 12 is removed from the vacuum mold and its edges are cut if necessary. Then, the preform 12 is inserted into a plastic mold.

At block 106, molten resin is injected into the mold through its injection aperture at a temperature and pressure sufficient to melt a bottom surface layer of the preform 12 and to form raised design portions (i.e., the word "sport") at an upper surface layer of the preform 12.

At block 108, the part is cooled to a temperature beneath the softening point of both resins.

At block 110, the mold is opened and the part is removed.

At block 112, the plastic part and the foil sheet composite 16 are placed or aligned in a hot stamping machine as illustrated in FIG. 4.

At block 114, the hot stamping machine is operated as indicated in FIGS. 5a–5e for a time sufficient to generate a temperature and pressure to melt the combined top surface layer of the raised design portions (i.e., the word "sport") and the bottom surface layer 20 of the foil sheet composite 16. The word "sport" is removed from the foil sheet 16 and bonded to the raised design portions of the preform 12 which spell out the word "sport."

At block 116, the resulting plastic part is cooled and the machine is opened by raising the die 30 and the completed plastic part 10 is removed from the machine.

While the best mode for carrying out the invention has been described in detail, those familiar with the art to which this invention relates will recognize various alternative designs and embodiments for practicing the invention as defined by the following claims.

What is claimed is:

1. A foil-covered plastic part comprising:
   a plastic structural substrate having an outer surface;
   a decorative preform bonded to the outer surface, the preform having a plurality of raised design portions having top and side surfaces formed in a plastic outer surface of the decorative preform; and a hot stamping foil having a plastic bottom layer and a foil top layer disposed on the plastic bottom layer, the plastic bottom layer being bonded to the plastic outer surface of the raised design portions to form the foil-covered plastic part wherein the foil layer completely covers the top surfaces but not the side surfaces of the raised design portions.

2. The part as claimed in claim 1 wherein the raised design portions represent graphical information.

3. The part as claimed in claim 1 wherein the decorative preform comprises a plastic film sheet compatible with the plastic of the substrate so that fusion occurs between the plastic film sheet and the outer surface of the substrate, the plastic film sheet being shaped correspondingly to the outer surface of the substrate.

4. The part as claimed in claim 3 wherein the plastic film sheet is covered with a layer of acrylic color and polyvinylidine fluoride and an acrylic clear coat layer and wherein the plastic layer of the hot stamping foil is compatible with the acrylic clear coat layer so that diffusion occurs therebetween.

5. The part as claimed in claim 1 wherein the foil layer is a chrome layer.

6. The part as claimed in claim 1 wherein the substrate is a plastic front panel of an automotive air bag cover adapted to enclose an uninflated automotive air bag.

\* \* \* \* \*